United States Patent
Lim et al.

(10) Patent No.: US 10,717,811 B2
(45) Date of Patent: *Jul. 21, 2020

(54) POLYESTER BASED COPOLYMER RESIN AND MOLDED PRODUCT COMPRISING THE SAME

(71) Applicant: SK CHEMICALS CO., LTD., Gyeonggi-do (KR)

(72) Inventors: Seol-Hee Lim, Seoul (KR); Sung-Gi Kim, Gyeonggi-do (KR)

(73) Assignee: SK Chemicals Co., Ltd., Seongnam (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/888,649

(22) PCT Filed: Apr. 30, 2014

(86) PCT No.: PCT/KR2014/003820
§ 371 (c)(1),
(2) Date: Nov. 2, 2015

(87) PCT Pub. No.: WO2014/178631
PCT Pub. Date: Nov. 6, 2014

(65) Prior Publication Data
US 2016/0068629 A1 Mar. 10, 2016

(30) Foreign Application Priority Data
May 2, 2013 (KR) .................. 10-2013-0049543

(51) Int. Cl.
*C08G 63/672* (2006.01)
*C08G 63/199* (2006.01)
*C08J 5/18* (2006.01)

(52) U.S. Cl.
CPC ......... *C08G 63/672* (2013.01); *C08G 63/199* (2013.01); *C08J 5/18* (2013.01); *C08J 2367/02* (2013.01)

(58) Field of Classification Search
CPC ...... C08G 63/199; C08G 63/82; C08G 63/85; C08G 63/183; C08G 63/672; C08G 63/83
See application file for complete search history.

(56) References Cited

U.S. PATENT DOCUMENTS

| 3,033,822 | A | 5/1962 | Kibler et al. |
| 4,748,274 | A | 5/1988 | Cregge et al. |
| 5,340,907 | A | 8/1994 | Yau et al. |
| 6,362,306 | B1 | 3/2002 | Shelby et al. |
| 2012/0226014 | A1 | 9/2012 | Lee et al. |
| 2012/0329980 | A1 | 12/2012 | George et al. |
| 2013/0274434 | A1* | 10/2013 | Kim .......................... C08J 5/18 528/308.7 |

FOREIGN PATENT DOCUMENTS

| EP | 2351782 | | 8/2011 |
| EP | 3012286 | | 4/2016 |
| JP | 2003-183421 | A | 7/2003 |
| JP | 2003-292590 | A | 10/2003 |
| JP | 2006-206860 | A | 8/2006 |
| KR | 10-2010-0060850 | A | 6/2010 |
| KR | 10-2011-0052890 | A | 5/2011 |
| KR | 10-1102574 | B1 | 12/2011 |
| KR | 10-2013-0015931 | A | 2/2013 |
| WO | WO2012/053821 | * | 4/2012 |

OTHER PUBLICATIONS

International Search Report prepared by the Korean International Searching Authority dated Aug. 25, 2014, for International Application No. PCT/KR2014/003820.
Extended Search Report for European Patent Application No. 14791699.3, dated Nov. 3, 2016, 6 pages.

* cited by examiner

Primary Examiner — Ling Siu Choi
Assistant Examiner — Gennadiy Mesh
(74) Attorney, Agent, or Firm — Sheridan Ross P.C.

(57) ABSTRACT

A polyester based copolymer resin which can be used a heat shrinkable film is disclosed. The polyester based copolymer resin includes a dicarboxylic acid-derived residue including a residue derived from an aromatic dicarboxylic acid, and a diol-derived residue including a residue derived from 4-(hydroxymethyl)cyclohexylmethyl 4'-(hydroxymethyl)cyclohexane carboxylate and a residue derived from 4,4-(oxybis (methylene)bis) cyclohexane methanol. The heat shrinkable film including polyester based copolymer resin has a shrinkage initiation temperature of 60° C. or less, the maximum heat shrinkage rate at 60° C. of 4% or more, and the maximum heat shrinkage rate at 90° C. of 80% or more.

4 Claims, No Drawings

POLYESTER BASED COPOLYMER RESIN AND MOLDED PRODUCT COMPRISING THE SAME

CROSS REFERENCE TO RELATED APPLICATIONS

This application is a national stage application under 35 U.S.C. 371 and claims the benefit of PCT Application No. PCT/KR2014/003820 having an international filing date of Apr. 30, 2014, which designated the United States, which PCT application claimed the benefit of Korean Patent Application No. 10-2013-0049543 filed May 2, 2013, the disclosures of each of which are incorporated herein by reference.

TECHNICAL FIELD

The present invention relates to a polyester based copolymer resin and a molded product comprising the same, and more particularly, to a polyester based copolymer resin capable of having an excellent shrinkage rate and being heat-shrunk at a low temperature, and a molded product comprising the same.

BACKGROUND

A heat shrinkable plastic product uses a property of being shrunk by heating and is widely used as a film for a shrinkage package, a shrinkage label, or the like. Among them, polyvinyl chloride (PVC), polystyrene, and polyester based plastic films have been used as a label or cap seal of various containers or used as a direct package material, or the like, However, a film made of polyvinyl chloride is a regulation object since at the time of burning up the film, materials generating hydrogen chloride and dioxin may be generated. In addition, when this product is used as a shrinkage label of a polyethylene terephthalate (PET) container, or the like, at the reusing the container, a troublesome process of separating the label and the container should be performed.

Further, in the polystyrene based film, stability in work depending on a shrinkage process may be excellent and an appearance of the product may be good, but chemical resistance may not be excellent, such that there is a problem in that at the time of printing, an ink having a specific composition should be used. Further, polystyrene based the film has a disadvantage in that since storage stability at room temperature is insufficient, the film may be spontaneously shrunk, such that a dimension thereof may be changed.

In order to solve the above-mentioned problem, a film made of a polyester resin has been studied and developed as a film capable of replacing the films made of the above-mentioned two raw materials. Meanwhile, as a use amount of the PET container is increased, a use amount of a polyester film capable of being easily reused without separately separating a label at the time of reuse has been gradually increased, but a heat shrinkable polyester film according to the related art had a problem in view of shrinkage characteristics. That is, there was a problem in that wrinkles at the time of shrinkage or non-uniform shrinkage during molding was frequently generated due to a rapid change in shrinkage behavior. In addition, since a shrinkage property of the polyester film at a low temperature is decreased as compared to the polyvinyl chloride based film or the polystyrene based film, in order to complement this disadvantage, the polyester film should be shrunk at a high temperature. In this case, there were problems in that PET container may be deformed, or a white-turbidity phenomenon (also called haze) may be generated.

Therefore, research into a polyester based copolymer resin capable of having an excellent shrinkage rate and improving a shrinkage property at a low temperature has been required.

DISCLOSURE

Technical Problem

The present invention has been made in an effort to provide a polyester based copolymer resin capable of having an excellent shrinkage rate and being heat-shrunk at a low temperature.

Technical Solution

An exemplary embodiment of the present invention provides a polyester based copolymer resin including: a dicarboxylic acid-derived residue including a residue derived from an aromatic dicarboxylic acid; and a diol-derived residue including a residue derived from 4-(hydroxymethyl)cyclohexylmethyl 4'-(hydroxymethyl)cyclohexane carboxylate represented by the following Chemical Formula 1 and a residue derived from 4,4-(oxybis(methylene)bis)cyclohexane methanol represented by the following Chemical Formula 2.

[Chemical Formula 1]

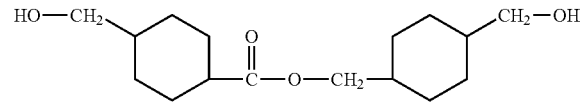

[Chemical Formula 2]

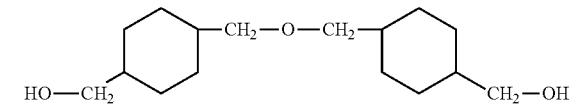

Further, the diol-derived residue may further include residues derived from 1,4-cyclohexanedimethanol, diethylene glycol, and ethylene glycol.

In addition, the aromatic dicarboxylic acid may be one or more selected from the group consisting of terephthalic acid, dimethyl terephthalate, cycloaliphatic dicarboxylic acid, isophthalic acid, adipic acid, azelaic acid, naphthalenedicarboxylic acid, and succinic acid.

Another exemplary embodiment of the present invention provides a method for preparing a polyester based copolymer resin including: reacting a dicarboxylic acid including an aromatic dicarboxylic acid with a diol including 4-(hydroxymethyl)cyclohexyl methyl 4'-(hydroxymethyl)cyclohexane carboxylate represented by Chemical Formula 1 and 4,4-(oxybis(methylene)bis)cyclohexane methanol represented by Chemical Formula 2 to perform an esterification reaction and a polycondensation reaction.

Further, the diol may further include 1,4-cyclohexanedimethanol, diethylene glycol, and ethylene glycol.

The diol may include 0.1 to 5 mol % of 4-(hydroxymethyl)cyclohexylmethyl 4'-(hydroxymethyl)cyclohexane carboxylate, 0.1 to 12 mol % of 4,4-(oxybis(methylene)bis)cyclohexane methanol, 0.1 to 15 mol % of 1,4-cyclohexanedimethanol, 2 to 15 mol % of diethylene glycol, and 53 to 97.7 mol % of ethylene glycol based on 100 mol % of the dicarboxylic acid.

The esterification reaction may be performed at a reaction temperature of 230 to 265 and a pressure of 1.0 to 3.0 kg/cm$^2$ for 100 to 300 minutes after injecting the diol at a molar ratio of 1.2 to 3.0 with respect to the dicarboxylic acid.

Further, in the polycondensation reaction, additives including a polycondensation catalyst, a stabilizer, and a coloring agent may be used.

Meanwhile, the polycondensation reaction may be performed at a reaction temperature of 260 to 290° C. and a reduced pressure of 400 to 0.1 mmHg.

Another exemplary embodiment of the present invention provides a molded product including the polyester based copolymer resin as described above, and the molded product may be a heat shrinkable film.

Advantageous Effects

The polyester based copolymer resin according to the present invention and the molded product comprising the same such as the heat shrinkable film, or the like, may have an excellent shrinkage rate as compared to the polyester based copolymer resin according to the related art, and be heat-shrunk at a low temperature, similarly to the PVC, thereby making it possible to prevent deformation or the white-turbidity phenomenon (also called haze) of the PET container that was caused in the heat shrinkage process of the film. In addition, since the shrinkage speed may be easily adjusted, such that the molding defect may be decreased.

BEST MODE

The present invention may be variously modified and have various types, and specific embodiments of the present invention will be descried in detail. However, the present invention is not limited to the exemplary embodiments described herein, but all of the modifications, equivalents, and substitutions within the spirit and scope of the present invention are also included in the present invention. Further, when it is determined that the detailed description of the known art related to the present invention may obscure the gist of the present invention, the detailed description thereof will be omitted.

According to an aspect of the present invention, there is provided a polyester based copolymer resin including: a dicarboxylic acid-derived residue including a residue derived from an aromatic dicarboxylic acid; and
a diol-derived residue including a residue derived from 4-(hydroxymethyl)cyclohexylmethyl 4'-(hydroxymethyl)cyclohexane carboxylate represented by the following Chemical Formula 1 and a residue derived from 4,4-(oxybis(methylene)bis)cyclohexane methanol represented by the following Chemical Formula 2.

[Chemical Formula 1]

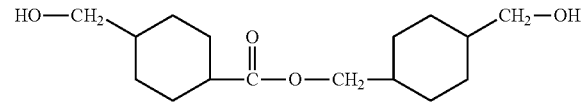

[Chemical Formula 2]

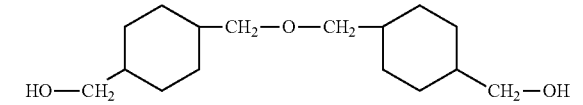

In addition, according to another aspect of the present invention, a method for preparing a polyester based copolymer resin including: reacting a dicarboxylic acid including an aromatic dicarboxylic acid with a diol including 4-(hydroxymethyl)cyclohexyl methyl 4'-(hydroxymethyl)cyclohexane carboxylate represented by Chemical Formula 1 and 4,4-(oxybis(methylene)bis)cyclohexane methanol represented by Chemical Formula 2 to perform an esterification reaction and a polycondensation reaction.

Further, according to another aspect of the present invention, there is provided a molded product including the polyester based copolymer resin as described above.

Hereinafter, the polyester based copolymer resin according to an exemplary embodiment of the present invention will be described in more detail.

As used herein, the term 'residue' means a predetermined moiety or unit included in a resultant of a chemical reaction when a specific compound participates in the chemical reaction, and derived from the specific compound. For example, the 'dicarboxylic acid-derived residue' and the 'diol-derived residue' mean moieties derived from a dicarboxylic acid component and a diol component in polyester formed by an esterification reaction or a polycondensation reaction, respectively.

The polyester based copolymer resin according to an exemplary embodiment of the present invention includes the dicarboxylic acid-derived residue including the residue derived from the aromatic dicarboxylic acid; and the diol-derived residue including the residue derived from 4-(hydroxymethyl)cyclohexylmethyl 4'-(hydroxymethyl)cyclohexane carboxylate represented by the following Chemical Formula 1 and the residue derived from 4,4-(oxybis(methylene)bis)cyclohexane methanol represented by the following Chemical Formula 2.

In a polyester film according to the related art, there was a problem in that due to a rapid change in shrinkage behavior, wrinkles at the time of shrinkage or non-uniform shrinkage during molding was frequently generated. In addition, since a shrinkage property of the polyester film at a low temperature is decreased as compared to the polyvinyl chloride based film or the polystyrene based film, in order to complement this disadvantage, the polyester film should be shrunk at a high temperature. In this case, there were problems in that PET container may be deformed, or a white-turbidity phenomenon (also called haze) may be generated.

Therefore, the present inventors confirmed through experiments that in the case of providing a polyester based copolymer resin prepared using a diol including 4-(hydroxymethyl)cyclohexylmethyl 4'-(hydroxymethyl)cyclohexane carboxylate and 4,4-(oxybis(methylene)bis) cyclohexane methanol, and a molded product such as a heat shrinkable film including the polyester based copolymer resin, a shrinkage rate was excellent, the film may be heat-shrunk at a low temperatures, similarly to a PVC, deformation and a white-turbidity phenomenon (also called haze) of a PET container that were caused in a heat shrinkage process of the film may be prevented, and since a shrinkage speed may be easily adjusted, a molding defect may be decreased, thereby completing the present invention.

As a diol compound used in order to improve moldability or other physical properties of a polymer prepared from terephthalic acid, diethylene glycol, and ethylene glycol, there are 4-(hydroxymethyl)cyclohexylmethyl 4'-(hydroxymethyl)cyclohexane carboxylate, 4,4-(oxybis(methylene)bis)cyclohexane methanol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, and the like. Particularly, as a diol compound used in order to improve physical properties of the polymer, 4-(hydroxymethyl)cyclohexylmethyl 4'-(hydroxymethyl)cyclohexane carboxylate and 4,4-(oxybis(methylene)bis)cyclohexane methanol are preferable. The reason is that in the case of using 4-(hydroxymethyl)cyclohexylmethyl 4'-(hydroxymethyl)cyclohexanecarboxylate and 4,4-(oxybis(methylene)bis)cyclohexane methanol, since a molecular chain length at a predetermined level or more associated with residual stress is increased as compared to the case of using the above-mentioned compounds, residual stress depending on the drawing may be increased, such that at the time heat supply, shrinkage force may be increased in accordance with residual stress relaxation.

4-(hydroxymethyl)cyclohexylmethyl 4'-(hydroxymethyl)cyclohexane carboxylate is represented by the following Chemical Formula 1, and 4,4-(oxybis(methylene)bis)cyclohexane methanol is represented by the following Chemical Formula 2.

[Chemical Formula 1]

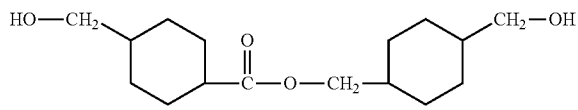

[Chemical Formula 2]

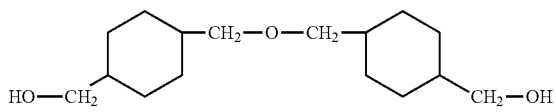

A use amount of 4-(hydroxymethyl)cyclohexylmethyl 4'-(hydroxymethyl)cyclohexane carboxylate and 4,4-(oxybis(methylene)bis) cyclohexane methanol used in the present invention is close to desired mol % in a final polymer. In order to prevent a moldability defect depending on crystallization, it is preferable that the use amount is 2 to 17 mol % of the entire diol component. The reason is that in the case in which the use amount is less than 2 mol %, it is difficult to confirm an effect of improving the shrinkage rate, and in the case in which the use amount is more than 17 mol %, the white turbidity-phenomenon (also called haze) may be generated due to over-drawing, such that utility of the polyester based copolymer resin as a raw material for the heat shrinkable film is deteriorated.

Further, the diol-derived residue may further include residues derived from 1,4-cyclohexanedimethanol, diethylene glycol, and ethylene glycol.

In addition, the aromatic dicarboxylic acid may be one or more selected from the group consisting of terephthalic acid, dimethyl terephthalate, cycloaliphatic dicarboxylic acid, isophthalic acid, adipic acid, azelaic acid, naphthalenedicarboxylic acid, and succinic acid.

The method for preparing a polyester based copolymer resin according to another aspect of the present invention may include: reacting the dicarboxylic acid including the aromatic dicarboxylic acid with the diol including 4-(hydroxymethyl)cyclohexylmethyl 4'-(hydroxymethyl)cyclohexane carboxylate represented by Chemical Formula 1 and 4,4-(oxybis(methylene)bis)cyclohexane methanol represented by Chemical Formula 2 to perform the esterification reaction and the polycondensation reaction.

In addition, the diol may further include 1,4-cyclohexanedimethanol, diethylene glycol, and ethylene glycol. That is, the diol may include 0.1 to 5 mol % of 4-(hydroxymethyl)cyclohexylmethyl 4'-(hydroxymethyl)cyclohexane carboxylate, 0.1 to 12 mol % of 4,4-(oxybis(methylene)bis)cyclohexane methanol, 0.1 to 15 mol % of 1,4-cyclohexanedimethanol, 2 to 15 mol % of diethylene glycol, and 53 to 97.7 mol % of ethylene glycol based on 100 mol % of the dicarboxylic acid.

The polyester based copolymer resin according to the present invention is prepared through the esterification reaction and the polycondensation reaction. The esterification reaction corresponding to a first step may be carried out batchwise or continuously, and each raw material may be separately injected, but preferably, the dicarboxylic acid may be injected into the diol in a slurry form.

In addition, the esterification reaction is performed at a reaction temperature of 230 to 265, more preferably, 245 to 255° C., and a pressure of 1.0 to 3.0 kg/cm$^2$ after injecting the diol at a molar ratio of 1.2 to 3.0 with respect to the dicarboxylic acid. Further, a reaction time of the esterification reaction may be generally about 100 to 300 minutes, but since the reaction time may be suitably changed according to the reaction temperature, the pressure, and the molar ratio of the glycol to the used dicarboxylic acid, the reaction time is not limited thereto.

Meanwhile, the esterification reaction does not require a catalyst, but in order to decrease the reaction time, a catalyst may be selectively injected.

After the above-mentioned esterification reaction is completed, the polycondensation reaction is carried out, and a polycondensation catalyst, a stabilizer, a coloring agent, and the like, may be selectively used as components generally used at the time of polycondensation reaction of a polyester resin.

As the polycondensation catalyst usable in the present invention, there are titanium, germanium, and antimony compounds, and the like, but the present invention is not particularly limited thereto.

The titanium based catalyst, which is a catalyst used as a polycondensation catalyst of a polyester resin in which cyclohexanedimethanol based derivative is copolymerized at a ratio of 15% or more based on a weight of terephthalic acid, has advantages in that even in the case of using a small amount of the titanium based catalyst as compared to the antimony based catalyst, the polycondensation reaction may be carried out, and the titanium based catalyst is cheaper than the germanium based catalyst.

More specifically, as a usable titanium based catalyst, there are tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethylacetoacetic ester titanate, isostearyl titanate, titanium dioxide, coprecipitates of titanium dioxide and silicon dioxide, coprecipitates of titanium dioxide and zirconium dioxide, and the like.

In this case, since a use amount of the polycondensation catalyst affects a color of the final polymer, the use amount may be changed according to the desired color, the used stabilizer, and the used coloring agent, but the use amount may be preferably 1 to 100 ppm, more preferably, 1 to 50 ppm, based on a content of a titanium element with respect to a weight of the final polymer, and may be 10 ppm or less based on a content of a silicon element. The reason is that in the case in which the content of the titanium element is less than 1 ppm, it is impossible to reach a desired degree of polymerization, and in the case in which the content is more than 100 ppm, the final polymer becomes yellow, such that it is impossible to obtain a desired color.

Further, as other additives, the stabilizer, the coloring agent, and the like, may be used. As the stabilizer usable in the present invention, there are phosphoric acid, trimethyl phosphate, triethylphosphate, triethylphosphonoacetate, and the like, and an addition amount thereof may be preferably 10 to 100 ppm based on a content of a phosphorus element with respect to the weight of the final polymer. The reason is that in the case in which the addition amount of the stabilizer is less than 10 ppm, it is difficult to obtain the desired color, and in the case in which the addition amount is more than 100 ppm, it is impossible to reach a desired high degree of polymerization.

Further, as the coloring agent usable in the present invention in order to improve the color, there are cobalt acetate, cobalt propionate, and the like, and an addition amount thereof may be preferably 100 ppm or less based on the weight of the final polymer. Furthermore, in addition to the coloring agent, an existing organic compound known in the art may be used as the coloring agent.

Meanwhile, the polycondensation reaction performed after adding these components may be preferably performed at 260 to 290° C. and a reduced pressure of 400 to 0.1 mmHg, but is not limited thereto.

The polycondensation step is performed until viscosity of the reactant reaches a desired inherent viscosity. In this case, a reaction temperature may be generally 260 to 290° C., preferably 260 to 280° C., and more preferably 265 to 275° C.

The molded product according to another aspect of the present invention may include the polyester based copolymer resin as described above, and be a heat shrinkable film.

This heat shrinkable film has a shrinkage initiation temperature of 60° C. or less, 40 to 60° C., or 50 to 60° C., the maximum heat shrinkage rate at 60° C. may be 4% or more, 4 to 10%, or 5 to 9%, and the maximum shrinkage rate at 90° C. may be 80% or more, 80 to 99%, or 81 to 95%.

Hereinafter, preferable Examples of the present invention will be described in detail. However, this example is only to illustrate the present invention and is not to be construed as limiting a scope of the present invention.

Example 1

A polyester resin in which 1 mol % of 4-(hydroxymethyl) cyclohexane carboxylic acid, 5 mol % of 4,4-(oxybis(methylene)bis) cyclohexane methanol, 1 mol % of 1,4-cyclohexanedimethanol, 10 mol % of diethylene glycol, and 83 mol % of ethylene glycol were copolymerized based on 14 moles of terephthalic acid was slowly heated to 255° C. while being mixed in a batch reactor (3 kg), thereby performing a reaction.

In this case, an esterification reaction was performed by discharging generated water out of the reactor, and when generation and discharge of water were terminated, contents of the reactor was transferred to a polycondensation reactor equipped with a stirrer, a cooling condenser, and a vacuum system.

After 0.5 g of tetrabutyl titanate, 0.4 g of triethyl phosphate, and 0.5 g of cobalt acetate were added to the esterification reactant, a reaction was primarily performed for 40 minutes under a low vacuum (atmospheric pressure to 50 mmHg) while raising an internal temperature from 240° C. to 275° C. Then, ethylene glycol was removed, and the pressure was slowly reduced to 0.01 mmHg, such that the reaction was performed under a high vacuum until a desired viscosity was obtained. Thereafter, the resultant was ejected and cut in a chip form. A heat shrinkable film was prepared using the prepared polyester based copolymer resin.

Example 2

A heat shrinkable film was prepared by the same manner as in Example 1 except that 2.5 mol % of 4-(hydroxymethyl) cyclohexane carboxylic acid, 11.5 mol % of 4,4-(oxybis (methylene)bis) cyclohexane methanol, 1.5 mol % of 1,4-cyclohexanedimethanol, 10 mol % of diethylene glycol, and 74.5 mol % of ethylene glycol were injected based on 14 moles of terephthalic acid.

Example 3

A heat shrinkable film was prepared by the same manner as in Example 1 except that 2.5 mol % of 4-(hydroxymethyl) cyclohexane carboxylic acid, 8 mol % of 4,4-(oxybis(methylene)bis) cyclohexane methanol, 5 mol % of 1,4-cyclohexanedimethanol, 10 mol % of diethylene glycol, and 74.5 mol % of ethylene glycol were injected, based on 14 moles of terephthalic acid.

Example 4

A heat shrinkable film was prepared by the same manner as in Example 1 except that 3 mol % of 4-(hydroxymethyl) cyclohexane carboxylic acid, 4.5 mol % of 4,4-(oxybis (methylene)bis) cyclohexane methanol, 7.5 mol % of 1,4-cyclohexanedimethanol, 10 mol % of diethylene glycol, and 75 mol % of ethylene glycol were injected, based on 14 moles of terephthalic acid.

Example 5

A heat shrinkable film was prepared by the same manner as in Example 1 except that 5 mol % of 4-(hydroxymethyl) cyclohexane carboxylic acid, 1 mol % of 4,4-(oxybis(methylene)bis) cyclohexane methanol, 10 mol % of 1,4-cyclohexanedimethanol, 10 mol % of diethylene glycol, and 74 mol % of ethylene glycol were injected, based on 14 moles of terephthalic acid.

Comparative Example 1

A heat shrinkable film was prepared by the same manner as in Example 1 except that 4-(hydroxymethyl)cyclohexylmethyl 4'-(hydroxymethyl)cyclohexane carboxylate and 4,4-(oxybis(methylene)bis)cyclohexane methanol were not used.

Comparative Example 2

A heat shrinkable polyester film was prepared using a PVC resin.

Experimental Example

Glass transition temperatures, shrinkage initiation temperatures, heat shrinkage rates, and inherent viscosity of the heat shrinkable films prepared using the polyester based copolymer resin prepared in Examples and Comparative Examples were measured by the following methods, and the measured results were shown in the following Table 1.

(1) Glass Transition Temperature (Tg): The glass transition temperature was measured using a differential scanning calorimetry (TA instrument Co.).

(2) Inherent Viscosity (IV): The inherent viscosity was measured using a Ubbelohde viscometer at a constant temperature bath of 35 after dissolving the prepared polyester based copolymer resin in ortho-chlorophenol at a concentration of 0.12% at 150.

(3) Heat Shrinkage Rate: A sample of the prepared film was cut into a square (10 cm×10 cm) and drawn at a draw ratio (DR) of 1:5 or 1:6 (MD:TD) and a draw speed of 50 to 60 mm/min, and then the film was put into an oven at a temperature shown in Table 1 for 40 seconds to thereby be heat-shrunk. Thereafter, a length of the sample in horizontal and vertical directions was measured, and the heat shrinkage rate was calculated by the following Equation.

Heat shrinkage rate (%)=100×(length before shrinkage−length after shrink)/(length before shrinkage)

TABLE 1

|  | Example 1 | Example 2 | Example 3 | Example 4 | Example 5 | Comparative Example 1 | Comparative Example 2 |
|---|---|---|---|---|---|---|---|
| 4-(Hydroxymethyl) cyclohexane carboxylic acid (mol %) | 1 | 2.5 | 2.5 | 3 | 5 |  |  |
| 4,4-(Oxybis(methylene)bis) cyclohexane methanol(mol %) | 5 | 11.5 | 8 | 4.5 | 1 |  |  |
| 1,4-Cyclohexanedimethanol (mol %) | 1 | 1.5 | 5 | 7.5 | 10 | 20 |  |
| Diethylene glycol (mol %) | 10 | 10 | 10 | 10 | 10 | 12 |  |
| Ethylene glycol (mol %) | 83 | 74.5 | 74.5 | 75 | 74 | 70 |  |
| Glass Transition Temperature (° C.) | 66 | 67 | 67 | 68 | 68 | 69 | 65 |
| IV | 0.69 | 0.7 | 0.72 | 0.72 | 0.71 | 0.7 |  |
| Shrinkage Initiation Temperature (° C.) | 50 | 55 | 55 | 58 | 57 | 60 | 50 |
| Heat Shrinkage Rate (%) at 60° C. | 7 | 7 | 7 | 7 | 8 | 8 | 6 |
| Heat Shrinkage Rate (%) at 90° C. | 81 | 87 | 85.7 | 91.5 | 95 | 78 | 65 |

As shown in Table 1, since the heat shrinkable film made of the polyester based copolymer resin according to the present invention has a low shrinkage speed due to a low shrinkage initiation temperature, a process may be smoothly controlled, such that a defect rate may be decreased, and moldability may be excellent. Therefore, a heat shrinkable film product having excellent moldability may be obtained by molding the polyester based copolymer resin as described above through an extruding and drawing process.

Although the present invention has been described in detail based on particular features thereof, and it is obvious to those skilled in the art that these specific technologies are merely preferable embodiments and thus the scope of the present invention is not limited to the embodiments. Therefore, the substantial scope of the present invention is defined by the accompanying claims and equivalent thereof.

What is claimed is:

1. A method for preparing a polyester based copolymer resin suitable for use in a heat shrinkable film having a shrinkage initiation temperature of less than 60° C., the method comprising: reacting a dicarboxylic acid including an aromatic dicarboxylic acid with a diol consisting of, based on 100 mol % of the dicarboxylic acid, between 1 mol % and 5 mol % of 4-(hydroxymethyl)cyclohexylmethyl 4'-(hydroxymethyl)cyclohexane carboxylate represented by the following Chemical Formula 1, between 1 mol % and 12 mol % of 4,4-(oxybis(methylene)bis) cyclohexane methanol represented by the following Chemical Formula 2, between 1 mol % and 15 mol % of 1,4-cyclohexanedimethanol, between 2 mol % and 15 mol % of diethylene glycol, and between 53 mol % and 95 mol % of ethylene glycol to perform an esterification reaction and a polycondensation reaction.

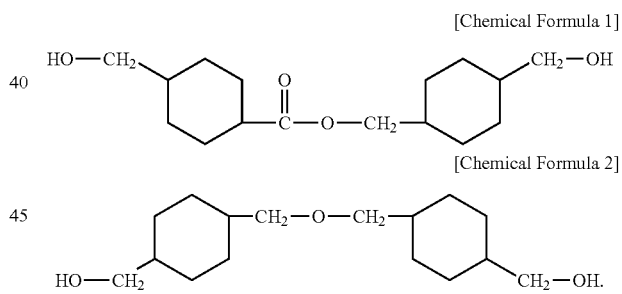

[Chemical Formula 1]

[Chemical Formula 2]

2. The method of claim 1, wherein the esterification reaction is performed at a reaction temperature of 230 to 265° C. and a pressure of 1.0 to 3.0 kg/cm² for 100 to 300 minutes after injecting the diol at a molar ratio of 1.2 to 3.0 with respect to the dicarboxylic acid.

3. The method of claim 1, wherein in the polycondensation reaction, additives including a polycondensation catalyst, a stabilizer, and a coloring agent are used.

4. The method of claim 1, wherein the polycondensation reaction is performed at a reaction temperature of 260 to 290° C. and a reduced pressure of 400 to 0.1 mmHg.

* * * * *